United States Patent
DePottey et al.

(10) Patent No.: US 6,764,118 B2
(45) Date of Patent: Jul. 20, 2004

(54) ACTIVE BUMPER ASSEMBLY

(75) Inventors: Timothy A. DePottey, Flint, MI (US); David W. Schneider, Waterford, MI (US); Charles J. Sherwin, Mayville, MI (US)

(73) Assignee: Autoliv ASP, Inc., Ogden, UT (US)

( * ) Notice: Subject to any disclaimer, the term of this patent is extended or adjusted under 35 U.S.C. 154(b) by 124 days.

(21) Appl. No.: 10/242,557

(22) Filed: Sep. 11, 2002

(65) Prior Publication Data

US 2004/0046403 A1 Mar. 11, 2004

(51) Int. Cl.[7] .............................................. B60R 19/40
(52) U.S. Cl. ........................... 293/118; 293/132; 293/2
(58) Field of Search .............................. 293/2, 4, 9, 10, 293/118, 132, 133

(56) References Cited

U.S. PATENT DOCUMENTS

| | | |
|---|---|---|
| 731,354 A | 6/1903 | Fulton |
| 1,986,273 A | 1/1935 | Leffingwell |
| 3,039,347 A | 6/1962 | Krauss et al. |
| 3,199,288 A | 8/1965 | Nahas |
| 3,565,398 A | 2/1971 | Floria et al. |
| 3,715,130 A | 2/1973 | Harada et al. |
| 3,853,199 A | 12/1974 | Hirashima et al. |
| 3,967,707 A | 7/1976 | Carlton |
| 3,992,047 A * | 11/1976 | Barenyi et al. ................ 293/9 |
| 4,026,590 A | 5/1977 | Holm |
| 4,037,821 A | 7/1977 | Greene |
| 4,091,621 A | 5/1978 | Patrichi |
| 4,237,690 A | 12/1980 | Tsuge et al. |
| 4,360,228 A * | 11/1982 | Rasmussen et al. ......... 293/118 |
| 4,514,002 A * | 4/1985 | McIntosh .................... 293/118 |
| 4,560,145 A | 12/1985 | Widmer |
| 4,582,351 A * | 4/1986 | Edwards .................... 293/118 |
| 4,687,189 A | 8/1987 | Stoll et al. |
| 4,932,697 A | 6/1990 | Hun |
| 5,052,732 A * | 10/1991 | Oplet et al. .................. 293/102 |
| 5,303,631 A | 4/1994 | Frehaut et al. |
| 5,370,429 A | 12/1994 | Reuber et al. |
| 5,431,087 A | 7/1995 | Kambara |
| 5,520,428 A * | 5/1996 | Bell .......................... 293/118 |
| 5,582,010 A | 12/1996 | Lell |
| 5,624,143 A | 4/1997 | Waldschmitt |
| 5,632,518 A * | 5/1997 | Kendall ...................... 293/103 |
| 5,639,117 A | 6/1997 | Mandzy et al. |
| 5,695,242 A | 12/1997 | Brantman et al. |

(List continued on next page.)

FOREIGN PATENT DOCUMENTS

| | | |
|---|---|---|
| DE | 33 13713 | 10/1984 |
| DE | 4 131 734 | 4/1993 |
| DE | 197 24 628 | 1/1998 |
| DE | 199 45 844 | 3/2001 |
| EP | 0535175 | 12/1994 |
| EP | 0 648 941 | 4/1995 |
| EP | 0 927 669 | 7/1999 |
| WO | WO 95/07415 | 3/1995 |
| WO | WO 98/33683 | 8/1998 |
| WO | WO 01/23225 | 4/2001 |
| WO | WO 02/055337 | 7/2002 |

Primary Examiner—Joseph D. Pape
Assistant Examiner—Greg Blankenship
(74) Attorney, Agent, or Firm—James D. Erickson; Sally J. Brown (57) ABSTRACT

An active bumper assembly for mounting to a vehicle is disclosed. The active bumper assembly includes a bumper that may be hingedly connected to a vehicle. When the bumper is in the inactivated position it is disposed behind the outer edge of the vehicle. When activated, the bumper is moved to an activated position, which is lower with respect to the inactivated position and extends below the outer edge of the vehicle. A sensing system detects an impending collision and generates a signal to which an actuator responds, moving the bumper from the inactivated position to the activated position. A locking member, configured to be interconnected between the bumper and the vehicle frame, then secures the bumper in the activated position.

34 Claims, 6 Drawing Sheets

U.S. PATENT DOCUMENTS

| | | | | |
|---|---|---|---|---|
| 5,713,596 A | | 2/1998 | Messina et al. | |
| 5,727,826 A | * | 3/1998 | Frank et al. | 293/102 |
| 5,810,427 A | * | 9/1998 | Hartmann et al. | 296/189 |
| 5,967,573 A | | 10/1999 | Wang | |
| 6,039,347 A | | 3/2000 | Maynard | |
| 6,057,797 A | | 5/2000 | Wagner | |
| 6,079,745 A | | 6/2000 | Wier | |
| 6,089,628 A | * | 7/2000 | Schuster | 293/118 |
| 6,102,439 A | | 8/2000 | Smithson et al. | |
| 6,183,025 B1 | * | 2/2001 | Hope et al. | 293/131 |
| 6,183,042 B1 | * | 2/2001 | Unrath | 296/189 |
| 6,264,258 B1 | * | 7/2001 | Li et al. | 293/102 |
| 6,340,142 B1 | | 1/2002 | Li | |
| 6,371,540 B1 | * | 4/2002 | Campanella et al. | 293/102 |
| 6,474,489 B2 | * | 11/2002 | Payne et al. | 213/221 |
| 2002/0033755 A1 | | 3/2002 | Ishizaki et al. | |
| 2002/0070524 A1 | | 6/2002 | Hedenberg | |
| 2002/0109427 A1 | | 8/2002 | Hochhalter et al. | |

* cited by examiner

ACTIVE BUMPER ASSEMBLY

BACKGROUND OF THE INVENTION

1. Field of the Invention

The present invention relates to bumper systems for motor vehicles. More specifically, the present invention relates to an active bumper assembly to be mounted on a vehicle for lowering the impact point of a collision.

2. Description of Related Art

A motor vehicle typically has a bumper for absorbing the impact of low velocity collisions. In general, bumpers are expected to withstand the impact of a collision at a relative velocity of 5 to 15 km/h without sustaining significant damage. Many conventional bumper systems include a stationary impact absorbing structure that can deform permanently or resiliently during a collision, thereby preventing damage to the vehicle frame, adjacent components, and vehicle occupants.

The typical low-impact absorbing bumpers include a metal or plastic shell that is filled with a foamed energy-absorbing block of polypropylene or foam mounted to the vehicle on a relatively rigid beam. The foamed energy absorbing material serves to cushion the impact of a collision, by absorbing the kinetic energy through deformation of the bumper structure. However, a significant disadvantage of the conventional bumper system is that it can only withstand low velocity collisions. High velocity collisions can result in unexpected damage to the vehicle and injury to passengers.

Recently, bumper systems for motor vehicles have been designed to convert some of the kinetic energy associated with a high-speed collision into work. This is so the bumper absorbs and dissipates the energy of the impact instead of compression or deformation of the vehicle body, including the passenger compartment. If the passenger compartment is compressed or deformed, its occupants could be subject to serious injury or death. Recently developed bumper systems provide a vehicle bumper that extends longitudinally away from the passenger compartment. Such an increase in the span between the bumper and the passenger compartment increases its energy absorbing capability by increasing the fraction of the impacting vehicle's kinetic energy that is converted into work. Although providing improvements in energy absorption, these bumper systems have not addressed the problem of vehicle compatibility.

Vehicle compatibility involves differences in vehicle characteristics between the striking vehicle and the target vehicle. Some of these characteristics include weight differences, geometry differences, differences in stiffness, and particularly differences in height off the ground. Vehicle compatibility becomes a concern when the striking vehicle and the target vehicle are mismatched, for instance, when a sport utility vehicle impacts a smaller compact car.

Conventional thinking indicates that when a larger car collides with a smaller one, the occupants of the smaller car usually fare worse. In such a collision, the smaller target vehicle undergoes a higher velocity change, and has less structure to absorb the crush. In a side impact, the larger striking vehicle is elevated with respect to the smaller target vehicle causing the brunt of the impact to be absorbed by the passenger compartment of the target vehicle, rather than striking its horizontal base member, or sill.

Since the side of the passenger compartment is often less stiff than the striking car's front, the side of the target vehicle is strongly deformed into the passenger compartment. The smaller target vehicle potentially has less interior space to mitigate this effect of intrusion into the passenger compartment and the striking vehicle can hit the passenger of the target vehicle at speeds approximating the initial speed of the striking vehicle. The occupants of the target vehicle are severely endangered thereby.

A recent analysis of crash data reveals that larger LTV (light truck or van) to car collisions produce a significantly higher rate of fatalities than car to car collisions. For example, when LTVs strike passenger cars on the left side, the risk of death to the car driver is five times higher than the risk associated with a car to car left side impact collision. The recent increase in the percentage and number of larger vehicles, such as LTVs, currently operating has exacerbated this problem.

One concept for addressing the problem of vehicle compatibility includes activating the vehicle suspension to lower the front end of the vehicle. The front end of the vehicle is lowered by opening valves in the air shocks just before an impending collision. The disadvantage to this concept is that if false activation occurs, dropping the whole front end of the vehicle may cause loss of vehicle stability, especially if unexpected dropping occurs during certain maneuvering conditions.

Accordingly, a need exists for a bumper system that addresses the problem of vehicle compatibility. Specifically, a bumper system for the striking vehicle is needed which will better engage the sill of a target vehicle, thereby decreasing the possibility of intrusion of the striking vehicle into the passenger compartment of the target vehicle. It is also desirable to conform to space requirements and aesthetic concerns so the bumper system does not protrude too far away from the outer edge of the vehicle nose under normal operating conditions.

It is further desirable to substantially maintain the striking vehicle's original approach angle under normal operating conditions, which is the maximum angle of an obstacle that can be approached without touching the nose of the vehicle. This is desirable so that the measure of the vehicle's ability to commit itself to a steep rise without getting stuck or damaging the vehicle remains relatively unchanged. Furthermore, it is desirable to maintain the ramp angle, which is the included angle of a ramp that will just clear under the belly of the vehicle. If the ramp angle of the vehicle is not preserved, the vehicle will become stuck on its belly when the driver tries to cross a ridge that requires more ramp angle than the vehicle has. Therefore, it is desirable to substantially maintain the vehicle's original approach and ramp angles underneath the vehicle so there will be enough clearance for normal and off-road vehicular conditions.

Furthermore, a need exists to maintain vehicular stability in the case of false activation of a bumper system, such that the activation of the bumper system goes virtually unnoticed by the vehicle operator.

The present invention as disclosed and claimed herewith meets these needs.

SUMMARY OF THE INVENTION

The apparatus of the present invention has been developed in response to the present state of the art, and in particular, in response to the problems and needs in the art that have not yet been fully solved by currently available bumper systems. Thus, the present invention provides an active bumper assembly to be mounted on a vehicle. The active bumper assembly mitigates the problems associated with vehicle compatibility by actively lowering a bumper of the striking vehicle to correspondingly lower the impact point of the target vehicle. Lowering the impact point of the target vehicle generally results in less intrusion into the passenger compartment of the target vehicle, thus preventing serious injury to the target vehicle's occupants.

In accordance with the invention as embodied and broadly described herein in the preferred embodiment, an active bumper assembly is provided. According to one embodiment, the active bumper assembly is configured to be mounted to the front end of a motor vehicle. Alternatively, the active bumper assembly could also be mounted on the rear of a vehicle for activation in anticipation of an impending rear-end collision. The active bumper assembly may comprise an active bumper that can be connected to a motor vehicle frame by a hinge member. The active bumper could contain energy absorbing material for absorbing the impact of a striking vehicle. The active bumper assembly also includes an actuator for moving the active bumper from an inactivated position to an activated position immediately before an impending collision. A hinged locking member is also interconnected between the active bumper and the vehicle frame for securing the active bumper in the activated position. Furthermore a sensing system may be employed for sensing an impending collision and generating a signal to activate the actuator.

The active, movable bumper may be separate from the stationary bumper usually found on most motor vehicles. When the active bumper assembly is mounted to a motor vehicle, the active bumper is capable of being in an inactivated and an activated position. When the active bumper is in the inactivated position it is disposed behind the outer edge of the vehicle, namely the stationary bumper. The active bumper in this position maintains the original vehicle aesthetics as it is hidden away from view. It also maintains space requirements in this position by not extending beyond the outer edge of the vehicle under normal operating conditions. The active bumper in this position also does not extend far below the stationary bumper, thereby substantially preserving the original approach angle and ramp angle underneath the vehicle, allowing for sufficient clearance for normal and off-road vehicular conditions.

A sensing system may be included to detect an impending collision. Such sensing systems may include optical sensors utilizing lasers, microwaves or infrared sensors. Radar sensors or ultrasonic sound wave sensors could be employed. An accelerometer for measuring heavy deceleration could also be used. When a radar sensor is used, a radar antenna sends out a short, tightly focused, high-power pulse of radio waves at a known frequency. When the waves hit an object, they echo off of it and the speed of the object Doppler-shifts the echo. The antenna receives the returning signals and an impending collision would be detected.

When the sensing system detects the impending collision, it generates a signal to which the actuator responds. The actuator may be any apparatus for rapidly moving the active bumper from the inactivated position to the activated position, such as a pyrotechnic, spring, solenoid, or air pressure activator. When a pyrotechnic is used, the signal generated by the sensing system operates to flash ignite pyrotechnic material, which creates a large amount of pressure from recently formed hot gases. This pressure thrusts a piston and rod downward, applying sufficient force against the active bumper to cause it to move rapidly into the activated position.

In the activated position, the active bumper is lowered below the stationary bumper and extends beyond the stationary bumper's outer edge. The active bumper, although moved from an inactivated to an activated position, maintains its connection to the vehicle frame by the hinge member. This movement is done without any loss of vehicle stability and goes virtually unnoticed by the operator of the striking vehicle. A hinged locking member, interconnected between the active bumper and the vehicle frame, then secures the active bumper in the activated position. The locking member prevents the active bumper from swinging back into the inactivated position upon collision with another motor vehicle by orthogonally abutting both the active bumper and the motor vehicle frame.

When the active bumper is thus configured, the impact point on the target vehicle is effectively lower than it would be if the stationary bumper had engaged the target vehicle. In the case of a sport utility vehicle colliding into a smaller compact car, the lowering of the impact point results in the sport utility vehicle engaging the horizontal base member, or sill, of the compact car, thereby reducing the amount of intrusion into the passenger compartment of the compact car, which reduces the likelihood of serious occupant injury.

The longitudinal extension of the active bumper beyond the outer edge of the stationary bumper also provides energy absorption by converting a portion of the kinetic energy of the colliding vehicles into work via the energy absorbing material contained in the active bumper. The energy absorbing material could be constructed of a variety of energy absorbing substances, such as a foamed polypropylene block, rubber, or aluminum or sheet metal arranged in a honeycomb pattern optionally filled with a wax like material. In the case of false activation, the active bumper can be reset into the inactivated position by the vehicle operator, without requiring service by the dealer or a repair shop.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 8, is not intended to limit the scope of the invention, as claimed, but is merely representative of presently preferred embodiments of the invention.

Figure 1:
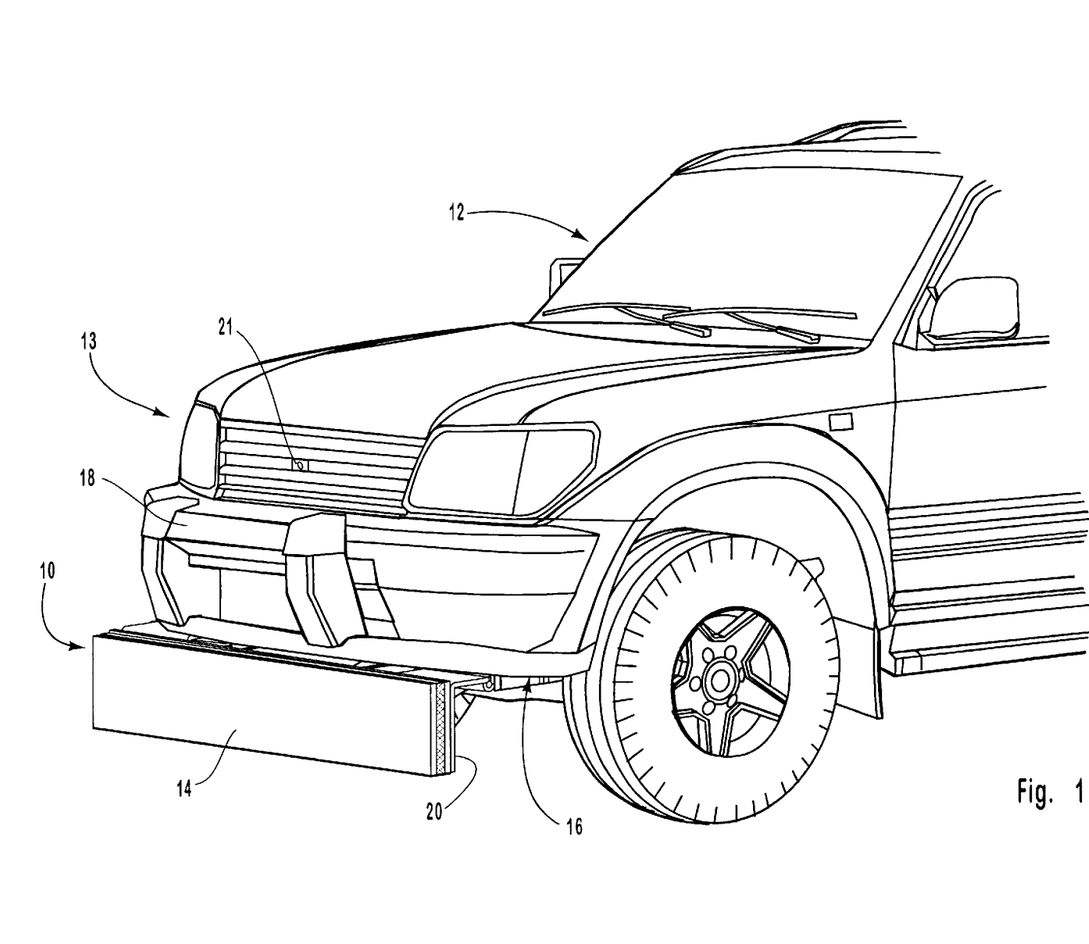
FIG. 1 is a perspective view of the active bumper assembly in the activated position, illustrated in operational relationship with a motor vehicle.

Referring to FIG. 1, an active bumper assembly 10 is depicted in operational relationship with a motor vehicle 12. In this embodiment, the active bumper assembly 10 is located proximate the front end 13 of the motor vehicle 12. Alternatively, the active bumper assembly 10 could also be mounted on the rear end (not shown) of the motor vehicle 12 for activation in anticipation of an impending rear-end collision. In FIG. 1, the active bumper 14 is shown in the activated position where it extends below the outer edge 16 of the stationary vehicle bumper 18. The active bumper assembly 10 is connected to the front end 13 of the motor vehicle 12 by a hinge 20. The hinge 20 could be any mechanical device for allowing movement of the active bumper 14 to and from the inactivated and activated positions.

Referring still to FIG. 1, a radar sensor 21 is shown proximate the front end 13 of the motor vehicle 12. The radar sensor 21 sends out a short, tightly focused, high-power pulse of radio waves at a known frequency. When the waves hit an object, such as another vehicle, they echo off of it and the speed of the object Doppler-shifts the echo: The radar sensor 21 receives the returning signals and determines whether an impending collision is imminent. Other types of sensing systems could be employed for detecting an impending collision such as lidar (light detection and ranging). With lidar, a very short burst of infrared laser light is emitted and its reflection is detected, thus determining the distance from the approaching vehicle. By taking thousands of samples per second, the change in distance indicates the location and speed of the oncoming vehicle. Other sensing systems such as ultrasonic sound wave sensors, optical microwave sensors, or an accelerometer for measuring heavy deceleration could be employed.

Figure 2:
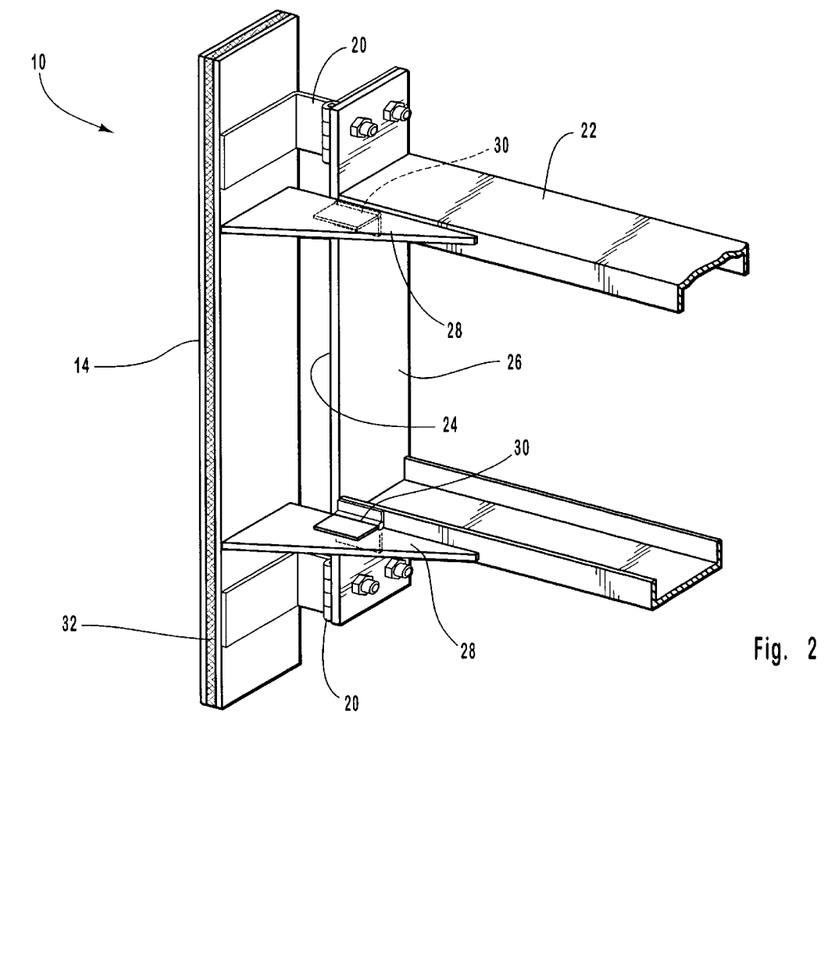
FIG. 2 is a perspective view of the active bumper assembly in the activated position mounted to a motor vehicle frame, as viewed from underneath the assembly.

Referring to FIG. 2, the active bumper assembly 10 is depicted in the activated position mounted to a motor vehicle frame 22, as viewed from underneath the active bumper assembly 10. The active bumper 14 extends beyond and below the outer edge 24 of the front end 26 of the motor vehicle frame 22 in the activated position. The active bumper 14 may be connected to the front end 26 of the motor vehicle frame 22 by at least one hinge 20. The hinge 20 can be any mechanical device for movably connecting the active bumper 14 to the motor vehicle frame 22.

Referring still to FIG. 2, once the active bumper assembly 10 is activated, at least one locking member 28 secures the active bumper 14 in place in the activated position. The locking member 28 is interconnected between the active bumper 14 and the motor vehicle frame 22. In this particular embodiment, the locking member 28 is triangular in shape and connected to the motor vehicle frame 22 by at least one hinge 30. This allows the locking member 28 to be folded so it does not extend far below, and is relatively planar with, the motor vehicle frame 22 when in the inactivated position. Once the active bumper assembly 10 is activated and the active bumper 14 is in the activated position, the locking member 28 prevents the active bumper 14 from swinging back into the inactivated position upon collision with another motor vehicle. This is accomplished by having the triangular locking member 28 orthogonally abut the active bumper 14 and the motor vehicle frame 22.

As shown in FIG. 2, the active bumper 14 contains energy absorbing material 32 to absorb energy incident to a vehicular collision. The energy absorbing material 32 of this embodiment consists of an aluminum lattice in a honeycombed pattern optionally filled with a wax like material. Other types of energy absorbing material 32 could be used such as a foamed polypropylene block, rubber, or sheet metal in a honeycomb pattern in order to convert a portion of the kinetic energy of the motor vehicle 12 into work in a collision.

Figure 3:
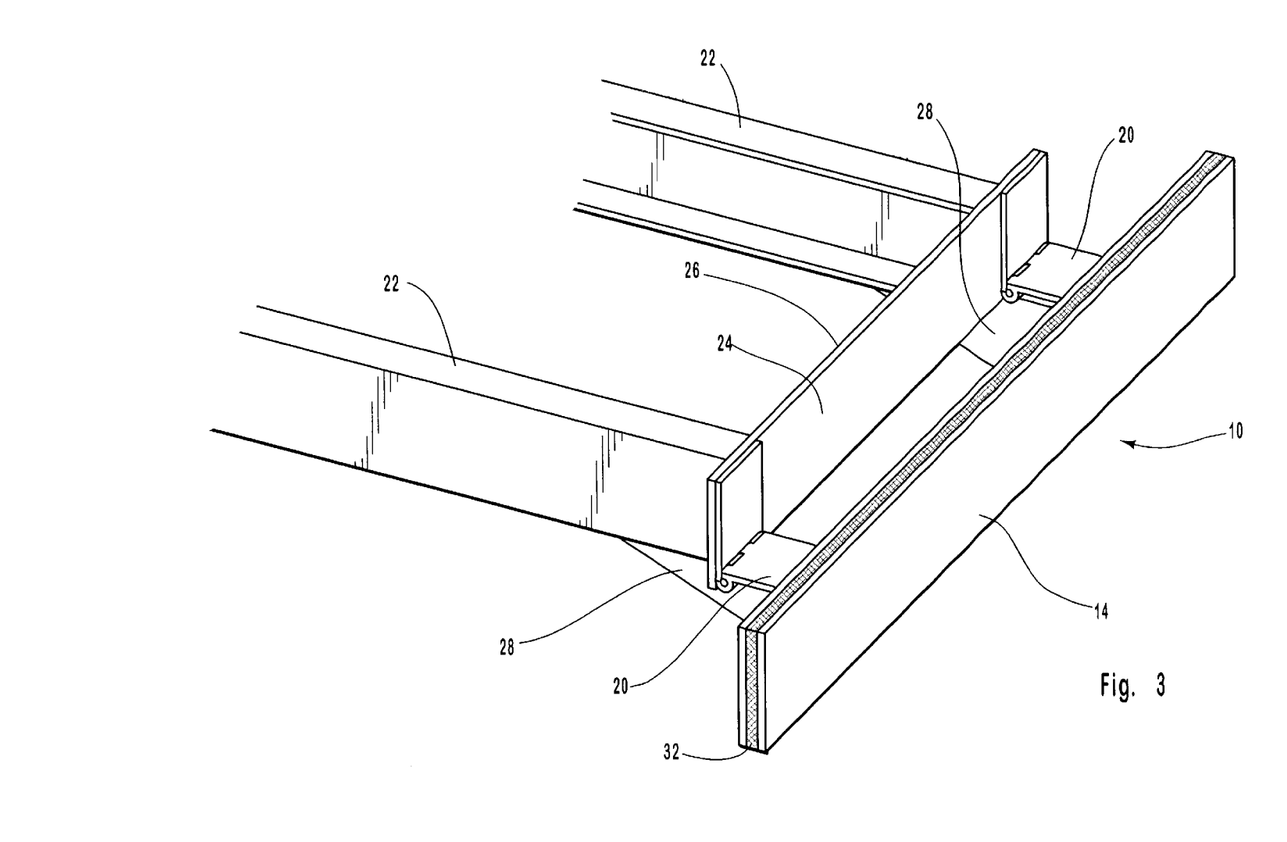
FIG. 3 is a perspective view of the active bumper assembly in the activated position mounted to a motor vehicle frame, as viewed from above the assembly.

Referring to FIG. 3, the active bumper assembly 10 is depicted in the activated position mounted to a motor vehicle frame 22, as viewed from above the active bumper assembly 10 looking downward. The active bumper 14 extends beyond and below the outer edge 24 of the front end 26 of the motor vehicle frame 22 in the activated position. The active bumper 14 is hingedly connected to the front end 26 of the motor vehicle frame 22 by at least one hinge 20. At least one locking member 28 is hingedly attached to the motor vehicle frame 22 to secure the active bumper 14 in the activated position. Energy absorbing material 32 is contained in the active bumper 14 to absorb energy upon impact.

Figure 4:
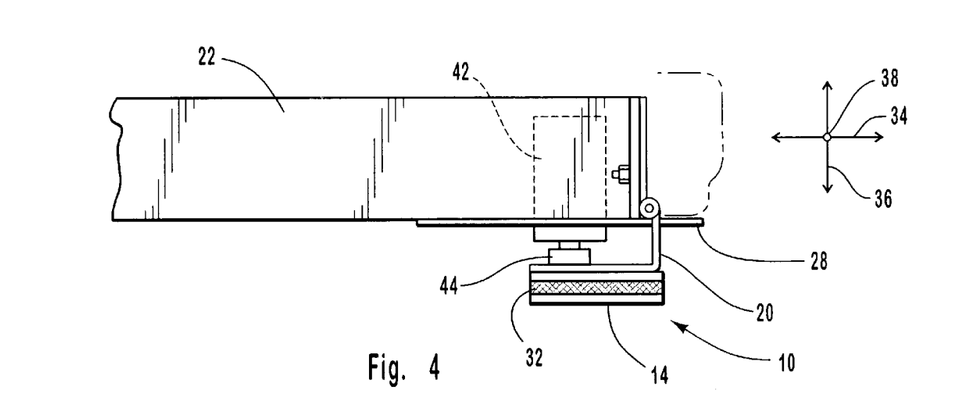
FIG. 4 is a side elevation view of the active bumper assembly in the inactivated position mounted to a motor vehicle frame.

Referring to FIG. 4, a side elevation view of the active bumper assembly 10 is depicted in the inactivated position mounted to a motor vehicle frame 22. The active bumper assembly 10 has a longitudinal direction 34, a lateral direction 36, and a transverse direction 38. In this position the active bumper 14 extends in the transverse direction 38, and is oriented to be substantially co-planar with the transverse 38 longitudinal 34 plane. The hinge 20, interconnecting the active bumper 14 and the motor vehicle frame 22, is oriented such that the active bumper 14 is higher in the lateral direction 36 and retracted in the longitudinal direction 34 with respect to the activated position. The hinged locking member 28 is connected to the motor vehicle frame 22 and folded, making it substantially co-planer with the transverse 38 longitudinal 34 plane.

Referring still to FIG. 4, an actuator 42 is shown above the active bumper 14 in the lateral direction 38. The actuator 42 may be any apparatus for rapidly moving the active bumper 14 from the inactivated position to the activated position, such as a pyrotechnic, spring, solenoid, or air pressure activator. As illustrated, the actuator 42 contains a protruding rod 44 for pushing the active bumper 14 into the activated position. The function and assembly of the actuator 42 will be described in greater detail in connection with FIG. 8.

As the motor vehicle 12 moves in the longitudinal direction 34, a sensing system, such as a radar sensor 21 will detect an impending collision. The radar sensor 21 detects a possible collision scenario based on the speed and distance of the approaching object. When an impending collision is detected by the radar sensor 21, a signal is generated which activates the actuator 42. The actuator 42 contains a pyrotechnic, which upon ignition, creates a large amount of pressure from recently formed hot gas. This pressure thrusts the protruding rod 44 downward in the lateral direction 36, as depicted in FIG. 5, and against the active bumper 14 with enough force to move the active bumper 14 rapidly from the inactivated position to the activated position.

Figure 5:
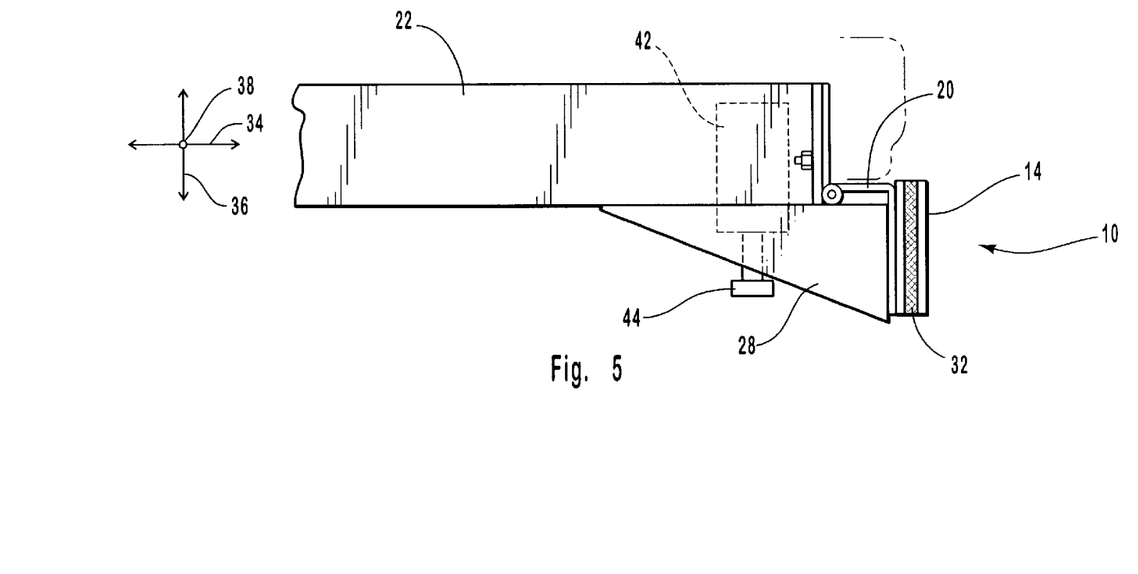
FIG. 5 is a side elevation view of the active bumper assembly in the activated position mounted to a motor vehicle frame.

Referring to FIG. 5, a side elevation view of the active bumper assembly 10 in the activated position is shown mounted to a motor vehicle frame 22. In this position, the hinge 20 is oriented so that the active bumper 14 is lower in the lateral direction 36 and extends further away from the motor vehicle frame 22 in the longitudinal direction 34 as compared to the inactivated position. The actuator 42 is shown after activation with the rod 44 extended below and outward in the lateral direction 36 as compared to the actuator 42 previous to activation.

Referring still to FIG. 5, the locking member 28 is hingedly connected to the motor vehicle frame 22, and configured to orthogonally abut the motor vehicle frame 22 and the active bumper 14 to secure the active bumper 14 in the activated position. The locking member 28 in this configuration is substantially co-planar with the lateral 36 longitudinal 34 plane. The locking member 28 allows the active bumper 14 to retain its activated position in an impact with another motor vehicle. This is accomplished by meeting the force applied from the impending motor vehicle against the active bumper 14, with an equal and opposite force from the sturdy motor vehicle frame 22 to which the locking member 28 orthogonally abuts.

As shown in FIG. 5, the active bumper 14 in the transverse direction 38 is oriented such that the energy absorbing material 32 can convert kinetic energy from a motor vehicle traveling at a high velocity into work when impacted in the longitudinal direction 34. An aluminum lattice arranged in a honeycombed pattern optionally filled with wax can be used as the energy absorbing material 32 contained in the active bumper 14. Upon impact, the aluminum lattice will undergo plastic deformation, thereby converting a portion of the colliding vehicle's kinetic energy into work. The motor vehicle 12 will undergo less plastic deformation upon impact because more of the impending vehicle's kinetic energy has been absorbed by the energy absorbing material 32. Other types of energy absorbing material 32 may be used such as a foamed polypropylene block, rubber or sheet metal in a honeycomb pattern.

Referring still to FIG. 5, the lowering of the active bumper 14 below the stationary vehicle bumper 18 in the lateral direction 36, engages the target vehicle at a lower point, preferably the sill, or horizontal base member of the target vehicle. When the striking motor vehicle 12 is elevated in the lateral direction 36 with respect to the smaller target vehicle, the lowering of the active bumper 14 prevents the brunt of the impact being absorbed by the passenger compartment of the target vehicle. Consequently, the side of the target vehicle is not as strongly deformed into its passenger compartment, and the occupants thereof are in less danger of serious injury or death.

If the active bumper assembly 10 is moved into the active position as shown in FIG. 5 because the sensor 21 or the actuator 42 malfunctions, causing the active bumper 14 to move into the activated position, it would go virtually unnoticed by the motor vehicle operator because vehicular stability is maintained. In such a case of false activation, the active bumper 14 may be reset into the inactivated position by the vehicle operator, without requiring service by the dealer or a repair shop.

Figure 6:
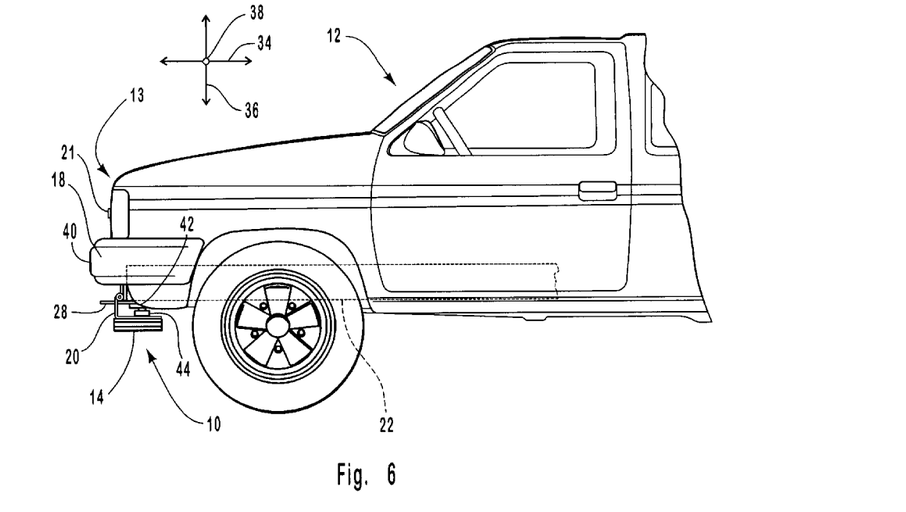
FIG. 6 is a side elevation view of the active bumper assembly in the inactivated position, illustrated in operational relationship with a motor vehicle.

Referring to FIG. 6, the active bumper assembly 10 is depicted in the inactivated position, illustrated in operational relationship with a motor vehicle 12. In this embodiment, the active bumper assembly 10 is located proximate the front end 13 of the motor vehicle 12. In the inactivated position, the active bumper 14 is disposed behind the vehicle nose 40 in the longitudinal direction 34. This configuration enables the motor vehicle 12 to meet certain space requirements in the longitudinal direction 34 under normal operating conditions.

The active bumper 14, as illustrated in FIG. 6, is connected to the motor vehicle frame 22 by a hinge 20. The hinged locking member 28 is shown folded into the transverse 38 longitudinal 34 plane. The actuator 42 and protruding rod 44 are housed above the active bumper 14 in the lateral direction 36. The radar sensor 21 is illustrated proximate the front end 13 of the motor vehicle 12.

The active bumper 14 in the inactivated position as shown in FIG. 6, is elevated in the lateral direction 36 with respect to the activated position, so the active bumper 14 does not hang far below the stationary vehicle bumper 18. The active bumper assembly 10 in this position does not substantially affect the original approach angle of the motor vehicle 12, which is the maximum angle an obstacle can be approached without touching the vehicle nose 40. Moreover, the original ramp angle, which is the included angle of a ramp that will just clear under the belly of the motor vehicle 12, will remain substantially unchanged as well. This permits the motor vehicle 12 to be used normally in both regular and off-road conditions. The active bumper assembly 10 in this configuration is concealed underneath the stationary vehicle bumper 18 in the lateral direction 36 and behind the vehicle nose 40 in the longitudinal direction 34, so the active bumper assembly 10 does not detract from the original motor vehicle 12 aesthetics.

Figure 7:
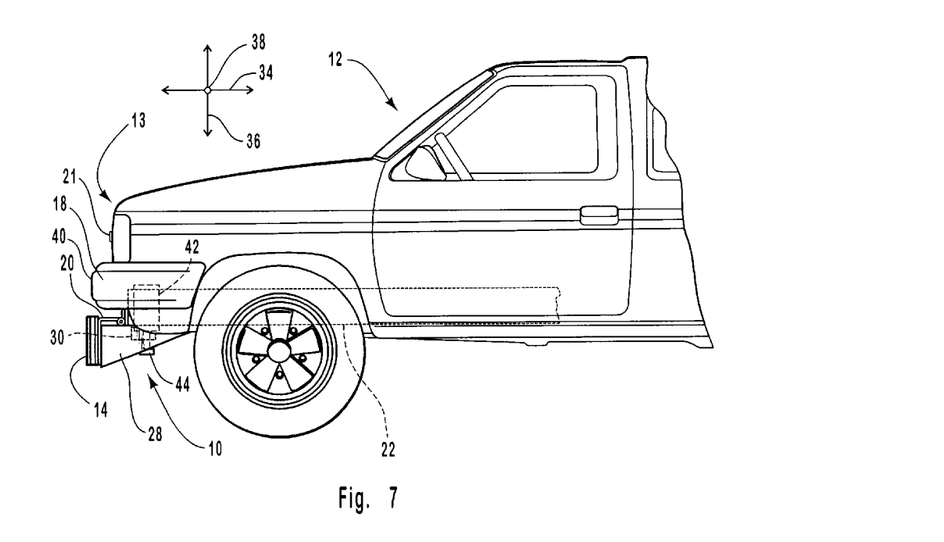
FIG. 7 is a side elevation view of the active bumper assembly in the activated position, illustrated in operational relationship with a motor vehicle.

Referring now to FIG. 7, an active bumper assembly 10 is depicted in the activated position in operational relationship with the front end 13 of a motor vehicle 12. In this position, the active bumper 14 extends below the stationary vehicle bumper 18 in the lateral direction 36 and beyond the outer edge of the motor vehicle nose 40 in the forward longitudinal direction 34. The extension of the active bumper 14 in the lateral direction 36 and the longitudinal direction 34 enables the active bumper 14 to make contact at a lower point with on target vehicle.

A hinge 20 interconnects the active bumper 14 and the motor vehicle frame 22, such that the active bumper 14 can swing from the inactivated position to the activated position and maintain connection with the motor vehicle frame 22. At least one locking member 28 is interconnected between the active bumper 14 and the motor vehicle frame 22. The locking member 28 is connected to the motor vehicle frame 22 by a hinge 30 so it can swing from its inactivated position to the activated position. The radar sensor 21 is depicted proximate the front end 13 of the motor vehicle 12. The actuator 42 and protruding rod 44 are also depicted after activation.

Figure 8:
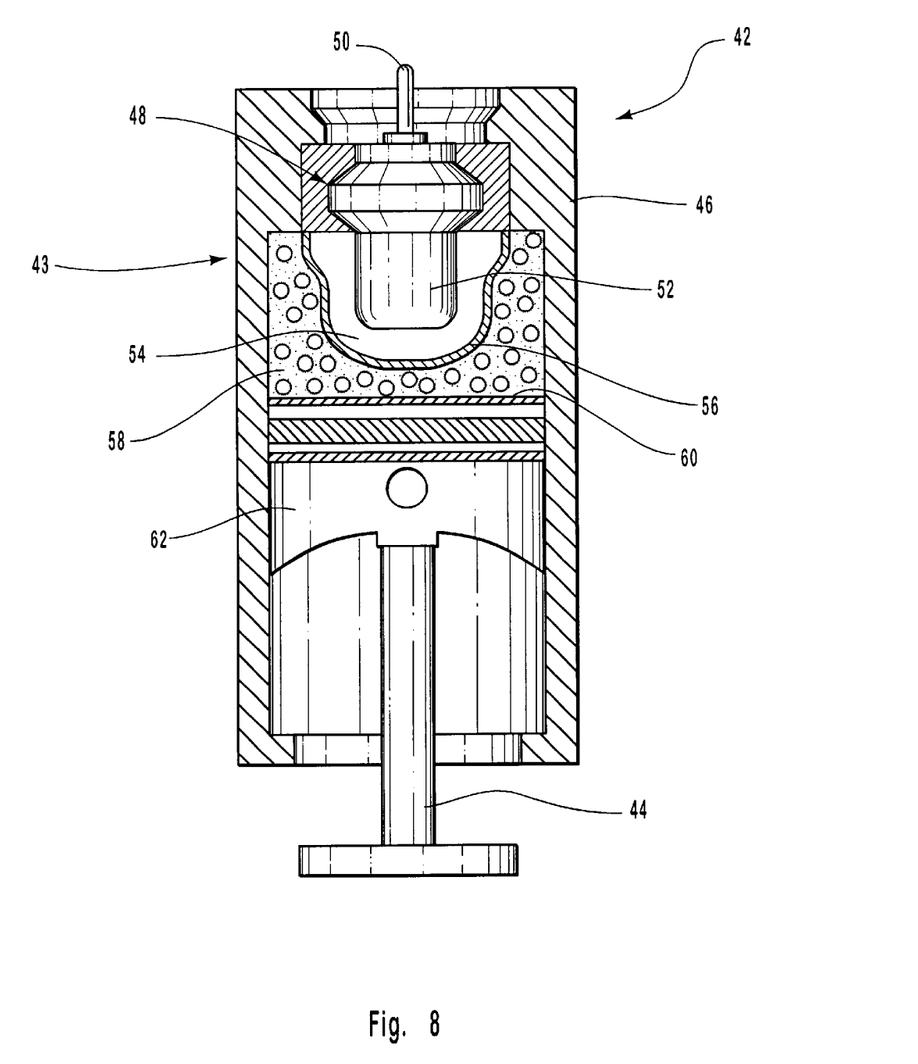
FIG. 8 is a cross sectional, side elevation view of the actuator utilizing a pyrotechnic for activating the active bumper assembly.

As mentioned above, several different types of actuators may be employed. In FIG. 8, one embodiment of an actuator 42 is depicted in a sectioned, side elevation view. The actuator 42 comprises a pyrotechnic 43, which pushes a rod 44 to activate the active bumper 14. The actuator 42 preferably comprises a housing 46 of a substantially tubular shape. However, the housing 46 need not be tubular, but may have any straight-sided, curved, or mixed shape. The housing 46 may be mounted to the motor vehicle frame 22 above the active bumper 14 in the inactivated position.

When an impending collision is detected, a signal is sent to the actuator 42 and received through electrical contacts 50 on the initiator 48 of the pyrotechnic 43. Current then passes through an ignition head 52 located within a cavity 54 of the pyrotechnic 43. When the current reaches a threshold level, it will flash ignite generant (not shown) within the ignition head 52. The ignition head 52 then ignites the pyrotechnic material 58 that was originally sealed off from the initiator 48 through a membrane 56. The pyrotechnic material 58 may be a liquid or gas, or may take the form of a solid, such as the powder arrangement depicted in FIG. 8. The membrane 56 need not assume the dome shape as depicted, but could take any shape selected to provide a seal between the initiator 48 and the pyrotechnic material 58.

Before ignition, the pyrotechnic material 58 is kept in place between a cap 60 and the membrane 56. Upon ignition, the membrane 56 disintegrates and the pyrotechnic material 58 ignites creating a large amount of pressure from recently formed hot gases. This pressure then thrusts the piston 62 downward along the length of the housing 46, away from the initiator 48. The protruding rod 44 connected to the piston 62, applies sufficient force to the active bumper 14 to cause it to move rapidly into the activated position.

Accordingly, the bumper system of the present invention presents significant improvements in addressing the problem of vehicle compatibility. By actively lowering and extending the active bumper of the present invention, the striking vehicle better engages the sill of the target vehicle, thereby decreasing the possibility of intrusion into the passenger compartment of the target vehicle. While mitigating the problems associated with vehicle compatibility, the present bumper system conforms to space requirements and aesthetic concerns by having a substantially concealed inactivated position under normal operating conditions. When installed on a motor vehicle, the present bumper system, in the inactivated position, also substantially maintains the vehicle's ramp and approach angles under normal operating conditions. Furthermore, when the bumper system of the present invention is activated, vehicular stability is maintained and the activation of the bumper system goes virtually unnoticed by the vehicle operator.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An active bumper assembly for use on a vehicle, comprising:
   a bumper;
   a hinge connected to the bumper and allowing movement of the bumper from a first position to a second position;
   a locking mechanism for securing the bumper in the second position;
   an actuator for moving the bumper from the first position to the second position in response to a signal; and
   a sensing system for sensing an impending collision, the sensing system generating the signal to which the actuator responds.

2. The active bumper assembly of claim 1, wherein the sensing system includes a radar sensor.

3. The active bumper assembly of claim 1, wherein the bumper in the second position is configured to extend beyond and below an outer edge of a nose on a vehicle to which the active bumper assembly is mounted.

4. The active bumper assembly of claim 3, wherein the bumper in the first position is elevated with respect to the second position and the bumper is configured to be disposed behind the outer edge of the nose of a vehicle to which the active bumper assembly is mounted.

5. The active bumper assembly of claim 1, wherein the actuator is selected from the group consisting of a pyrotechnic, a spring, a solenoid, and an air pressure activator.

6. The active bumper assembly of claim 1, wherein the bumper comprises an energy absorbing material.

7. The active bumper assembly of claim 6, wherein the energy absorbing material is an aluminum lattice.

8. The active bumper assembly of claim 1, wherein the bumper is resettable to the first position after activation to the second position.

9. The active bumper assembly of claim 1, wherein the locking mechanism is configured to be hingedly connected to a vehicle frame.

10. The active bumper assembly of claim 1, wherein the active bumper assembly is configured to be located proximate a front end of the vehicle.

11. The active bumper assembly of claim 1, wherein the active bumper assembly is configured to be located proximate a rear end of the vehicle.

12. An active bumper assembly for use on a vehicle, comprising:
    a bumper;
    a hinge connected to the bumper allowing movement of the bumper from a first position to a lower second position when the active bumper assembly is mounted to the vehicle;
    a locking mechanism for securing the bumper in the second position;
    an actuator for moving the bumper from the first position to the second position in response to a signal; and
    a sensing system for sensing an impending collision, the sensing system generating the signal to which the actuator responds.

13. The active bumper assembly of claim 12, wherein the sensing system includes a radar sensor.

14. The active bumper assembly of claim 13, wherein the bumper in the second position is configured to extend beyond and below an outer edge of a nose of the vehicle to which the active bumper assembly is mounted.

15. The active bumper assembly of claim 14, wherein the bumper in the first position is elevated with respect to the second position and the bumper is configured to be disposed behind the outer edge of the nose of the vehicle to which the active bumper assembly is mounted.

16. The active bumper assembly of claim 15, wherein the actuator is selected from the group consisting of a pyrotechnic, a spring, a solenoid, and an air pressure activator.

17. The active bumper assembly of claim 16, wherein the bumper comprises an energy absorbing material.

18. The active bumper assembly of claim 17, wherein the energy absorbing material is an aluminum lattice.

19. The active bumper assembly of claim 18, wherein the bumper is resettable to the first position after activation to the second position.

20. An active bumper assembly for mounting on a vehicle, comprising:

a bumper which is orientable between a first position in which the bumper is configured to be disposed behind an outer edge of a vehicle to which it is mounted, and a second position in which the bumper is lowered with respect to the first position and configured to extend below the outer edge of the vehicle;

a hinged connection attached to the bumper for connecting the bumper to the vehicle;

a locking member configured to be interconnected between the bumper and a vehicle frame for securing the bumper in the second position;

an actuator for moving the bumper from the first position to the second position in response to a signal; and a sensing system for sensing an impending collision, the sensing system generating the signal to which the actuator responds.

21. The active bumper assembly of claim 20, wherein the sensing system includes a radar sensor.

22. The active bumper assembly of claim 20, wherein the actuator is selected from the group consisting of a pyrotechnic, a spring, a solenoid, and an air pressure activator.

23. The active bumper assembly of claim 20, wherein the bumper comprises an energy absorbing material.

24. The active bumper assembly of claim 23, wherein the energy absorbing material is an aluminum lattice.

25. The active bumper assembly of claim 20, wherein the bumper is resettable to the first position after activation to the second position.

26. The active bumper assembly of claim 20, wherein the locking member is hingedly connected to a vehicle frame.

27. The active bumper assembly of claim 20, wherein the bumper further extends beyond the outer edge of the vehicle in the second position.

28. The active bumper assembly of claim 20, wherein the active bumper assembly is configured to be located proximate a front end of the vehicle.

29. The active assembly of claim 20, wherein the active bumper assembly is configured to be located proximate a rear end of the vehicle.

30. An active bumper assembly for mounting on a vehicle, comprising:

a bumper which is orientable between a first position in which the bumper is configured to be disposed behind an outer edge of a nose of the vehicle, and a second position in which the bumper is lowered with respect to the first position and configured to extend below and beyond the outer edge of the nose of the vehicle when the active bumper assembly is mounted to the vehicle;

a hinge attached to the bumper for connecting the bumper to a vehicle frame;

a hinged locking member configured to be interconnected between the bumper and a vehicle frame for securing the bumper in the second position;

an actuator for moving the bumper from the first position to the second position in response to a signal; and a radar sensor for sensing an impending collision, the radar sensor generating the signal to which the actuator responds.

31. The active bumper assembly of claim 30, wherein the actuator is selected from the group consisting of a pyrotechnic, a spring, a solenoid, and an air pressure activator.

32. The active bumper assembly of claim 30, wherein the bumper comprises an energy absorbing material.

33. The active bumper assembly of claim 32, wherein the energy absorbing material is an aluminum lattice.

34. The active bumper assembly of claim 31, wherein the bumper is resettable from the second position to the first position after activation to the second position.

* * * * *